SYSTEM FOR INITIALLY ADJUSTING A SIGNAL EQUALIZING DEVICE

Filed Dec. 19, 1966 Sheet 1 of 3

INVENTOR
E. PORT
BY
J. P. Kearns
ATTORNEY

United States Patent Office 3,447,103

Patented May 27, 1969

3,447,103

SYSTEM FOR INITIALLY ADJUSTING A SIGNAL EQUALIZING DEVICE

Erich Port, Red Bank, N.J., assignor to Bell Telephone Laboratories, Incorporated, Murray Hill and Berkeley Heights, N.J., a corporation of New York Filed Dec. 19, 1966, Ser. No. 602,936

Int. Cl. H03h *5/12*; H03k *3/26*

U.S. Cl. 333—28 7 Claims

ABSTRACT OF THE DISCLOSURE

Two adaptively adjusted time domain equalizers are disclosed in which all but one of a plurality of signals added together to provide an equalized signal are initially attenuated to inhibit arbitrary equalization signals. As adaptive equalization proceeds the attenuation factor is decreased to a steady state value.

*Field of the invention*

This invention relates to a system for equalizing a signal transmitted through a signal distorting medium and particularly to a signal equalization system in which components of an equalized signal ultimately to be provided by voltage controlled multipliers are initially suppressed by voltage controlled attenuators.

*Background of the invention*

When a multifrequency signal which includes a series of individual data or symbol bits is transmitted through a bandwidth limited medium, different frequency components in the signal may be delayed and attenuated different amounts so that components from more than one of the individual symbol bits may coincidentally arrive at a signal receiver thereby causing intersymbol interference. One device used to equalize a received signal distorted by intersymbol interference is a delay-line transversal filter. Another device, disclosed by F. K. Becker in a copending patent application, Ser. No. 333,030, now Patent No. 3,315,171, filed Dec. 24, 1963, entitled, "Digitalized Transversal Filter," may also be used to equalize a received signal distorted by intersymbol interference.

The delay-line transversal filter and the digitalized transversal filter are both time domain devices in which one or more equalization signals each equal to a multiple of the received signal, displaced in time, are added to the received signal to provide an equalized output signal. These devices may be adjusted by randomly hand-changing resistance values in transversal filter multipliers to change the received signal multiples until the equalized output signal acquires a characteristic shape. Hand-changing resistance values, while producing the desired result, is time consuming and therefore has been used only to equalize transmission media which are to be used for extended periods of times. When transmitting digital data over direct distance dialing voice channels, a new transmission medium to be equalized is established for each call. These voice channels must be equalized quickly compared to the length of data transmission to render equalization practical. A system disclosed by F. K. Becker-R. W. Lucy-E. Port, U.S. Patent No. 3,292,110, entitled, "Transversal Equalizer for Digital Transmission Systems Wherein Polarity of Time-Spaced Portions of Output Signal Controls Corresponding Multiplier Setting," issued Dec. 13, 1966, automatically and systematically adjusts multipliers in a transversal filter during an initial training signal transmission period, in response to signals derived from a predetermined training signal. This system is faster than hand adjusting the transversal filter but does require a training period. A system disclosed by R. W. Lucky in a copending patent application, filed June 2, 1965, Ser. No. 460,794, now Patent No. 3,368,168 entitled "Adaptive Equalizer for Digital Transmission Systems," eliminates the need for a training period by adjusting multipliers in a transversal filter in response to information extracted from a received digital data signal. Another system disclosed by R. W. Lucky in a copending patent application filed Aug. 27, 1965, Ser. No. 483,129, entitled, "Digital Adaptive Equalizer System," extends the system disclosed in the R. W. Lucky application, Ser. No. 460,794, to adjust a transversal filter to compensate for intersymbol interference in a multilevel coded signal.

Existing automatic or adaptive transversal filter equalizer systems employ discrete valued resistor attenuators in combination with inverting amplifiers as multipliers. The multiplying factors may be varied by using relays or transistors to physically switch resistors in the voltage dividers. At the start of automatic or adaptive adjustment of a transversal filter equalizer the multiplying factors are set to zero by switching appropriate discrete value resistors in the attenuators. In this way, it is assured that arbitrary equalization signals are not added to the received signal. As equalization progresses the multiplying factors are positively or negatively increased from zero to provide the proper equalization signals to equalize the received signals.

It has been recognized that continuously variable controlled impedance attenuators such as those employing field-effect transistors, lamp-photo cell arrangements or varicaps, could be used in transversal filter multipliers resulting in smaller, lighter and less costly transversal filter multipliers. The existing transversal filter equalizer systems would be further simplified because digital counting circuitry normally associated with the switched resistor multipliers would be replaced by capacitors.

One property of multipliers employing continuously variable controlled impedance devices detract from their usefulness in equalizers. The multiplication factor exhibited by such a multiplier is a function of the characteristics of the controlled impedance device used therein. As a result of the wide spread in the characteristics of controlled impedance devices of the same type, the characteristics of a multiplier employing a particular type of controlled impedance device may differ substantially from another equally constructed multiplier employing the same type of controlled impedance device. Therefore, while the multiplication factor of a controlled impedance multiplier will always vary when a controlled input signal applied thereto is varied within the linear range of the multiplier, the exact multiplication factor exhibited for a given multiplier is not readily predictable for a given controlled input signal. In a system for automatically or adaptively adjusting a transversal filter equalizer, the exact multiplication factor of a particular multiplier need not always be known because the multipliers are normally included in a feedback loop. However, during the initial adjustment of the equalizer the multiplication factors should be set as close to zero as possible so that arbitrary correction signals are not added to the received signal. Arbitrary correction signals would increase the error rate in the equalized output signal and result in substantially longer equalization time. It has been found that even a judicious choice of controlled input signals will not always reduce the multiplying factors sufficiently close to zero so as to permit rapid automatic or adaptive equalization to proceed.

Therefore, it is an object of this invention to provide a system for equalizing a signal transmitted through a signal distorting medium.

It is another object of this invention to provide a signal equalization system which will incorporate the advantages inherent in the use of controlled impedance multipliers and yet will not initially degrade a received signal so as to prevent rapid automatic or adaptive equalization.

*Summary of the invention*

With these and other objects in view, the present invention contemplates a system in which a received signal distorted by transmission through a signal distorting medium is first multiplied by a first value and then attenuated by a time variable value to provide an attenuated equalization signal. The attenuated equalization signal is combined with the received signal resulting in an equalized output signal.

In one embodiment, the time variable factor is increased from a zero reference value to a steady state value so that an equalization signal is added to the received signal at a proper rate to allow adaptive or automatic equalization to occur.

*Drawings*

Other objects and advantages of the invention will become apparent by reference to the following detailed specification and accompanying drawings wherein.

*Detailed description*

Figure 1:
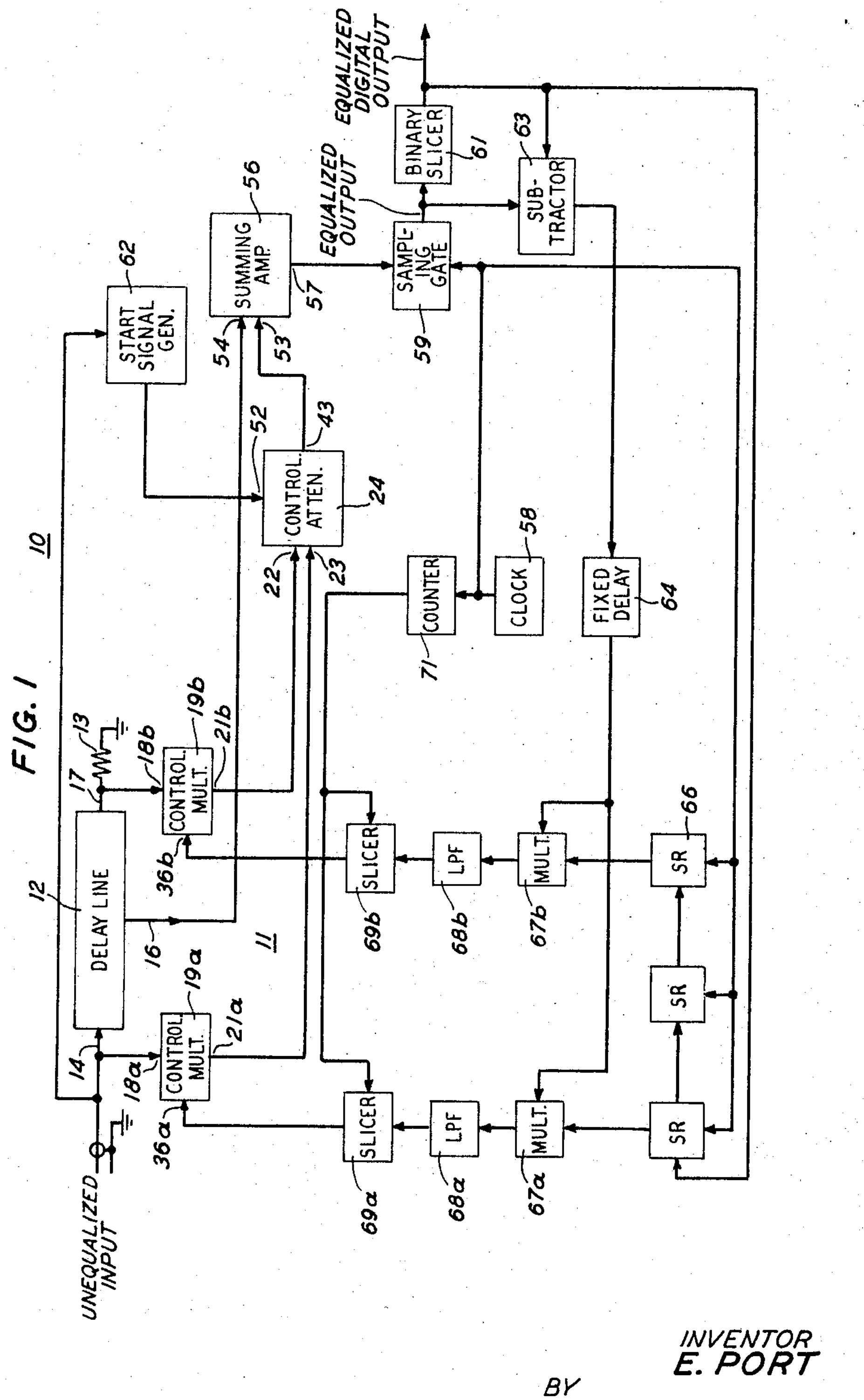
FIG. 1 depicts in block diagram form an adaptive delay-line transversal filter equalization system embodying the principles of this invention.

In FIG. 1, there is seen an adaptive transversal filter equalization system 10 of the type disclosed in the aforementional patent application of R. W. Lucky, Ser. No. 460,794 modified to incorporate the principles of the present invention. A transversal filter 11 includes a center tapped delay line 12 terminated in its characteristic impedance 13 for delaying signals applied to the delay line 12 to provide three identical signals displaced in time. One signal being available at an input terminal 14 of the delay line 12, a second signal at a center tap 16 of the delay line 12, and a third signal at an output terminal 17 of the delay line 12. It should be understood that a delay line providing any number of time displaced signals may be employed in the system of this invention. Three has been selected in this instance as an example for ease of explanation.

The input terminal 14 and the output terminal 17 of the delay line 12 are connected to signal input terminals **18*a* and 18*b* of a pair of voltage controlled multipliers 19*a* and 19*b*, respectively. A pair of output terminals 21*a* and 21*b* of the voltage controlled multipliers 19*a* and 19*b* are fed to a pair of input terminals 22 and 23 of a variable gain adder or voltage controlled attenuator 24**. Both voltage controlled multipliers and voltage controlled attenuators provide output signals proportional to the product of two signals applied thereto; however, a voltage controlled multiplier will have an output dynamic range going both positive and negative from a reference value while a voltage controlled attenuator will have an output dynamic range only positive or negative from a reference value.

Figure 3:
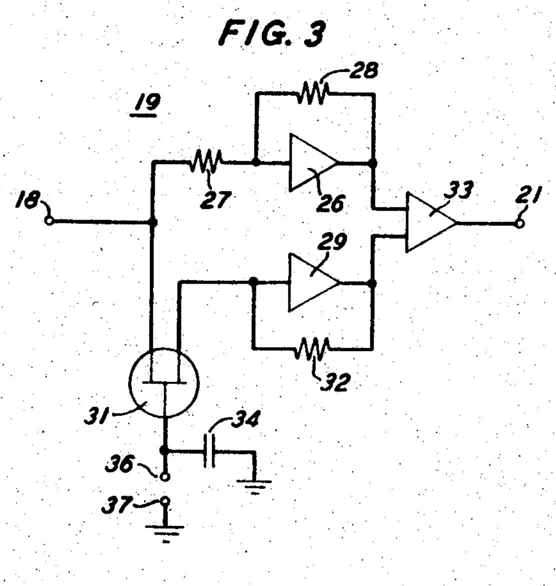
FIG. 3 shows a circuit diagram of a four quadrant multiplier which is suitable for use in a system embodying the principles of the invention.

The multiplier 19, shown in FIG. 3, includes two signal paths from the input terminal 18 to the output terminal 21. The first path includes an inverting or operational amplifier 26 having an input resistor 27 and a feedback resistor 28 to determine the closed loop gain of the amplifier 26. The second path includes an inverting or operational amplifier 29 employing the drain to source impedance of a field-effect transistor 31 as an input resistor and having a feedback resistor 32. The outputs of the two operational amplifiers 26 and 29 are subtracted in a differential amplifier 33. A capacitor 34 is connected between the gate and ground of the field-effect transistor 31 to store or integrate signals applied between a pair of control input terminals 36 and 37.

A signal applied to the input terminal 18 will be amplified by the operational amplifier 26 an amount determined by the resistors 27 and 28 and will be amplified by the operational amplifier 29 an amount determined by resistor 32 and the source to drain impedance of the field-effect transistor 31. If the resistors 28 and 32 are made equal and the resistor 27 is chosen to be equal to the source to drain impedance of the field-effect transistor 31 at a known bias, no signal will appear at the output terminal 22 when the field-effect transistor 31 is biased at the known bias because the output from amplifier 26 will be equal to that from amplifier 29. There will thus result no difference signal for amplifier 33 to pass. It is apparent that as the bias of the field-effect transistor 31 is varied above or below the known bias, an output signal appearing at the terminal 21 will exhibit an amplitude proportional to the field-effect transistor bias and a phase dependent upon the sign of the bias with respect to the known bias. The amplitude and phase of the signal at the output 21 will also be dependent upon the amplitude and phase of the signal applied to input terminal 18. Therefore, it is seen that the device shown in FIG. 3 is a true four quadrant multiplier. In practice, resistor 27 is chosen to be a value equal to the source to drain impedance of the field-effect transistor 31 somewhere in the middle of its operating range. The exact impedance of the field-effect transistor 31 for a given bias may vary over a wide range depending on temperature and from device to device.

Figure 4:
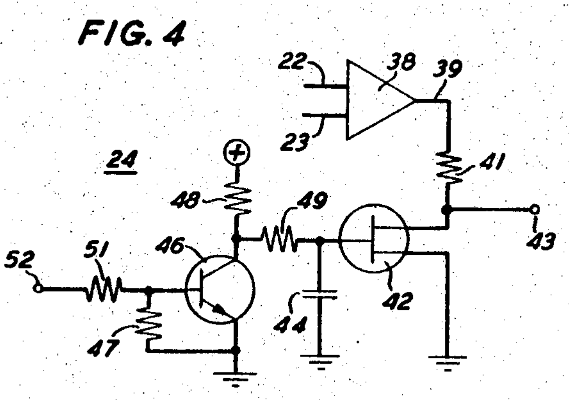
FIG. 4 shows the details of a voltage controlled attenuator representative of the type used in systems of this invention.

Voltage controlled attenuator 24, shown in FIG. 4, includes a summing amplifier 38 having an output terminal 39 for providing an output signal equal to the sum of signals applied to the input terminals 23 and 24. A voltage divider comprising a resistor 41 and the source to drain impedance of field-effect transistor 42, provides an attenuated signal proportional to the signal at the terminal 39 at a terminal 43. The source to drain impedance of the field-effect transistor 42, and therefore the attenuation ratio of the voltage divider, is controlled by a voltage appearing across a capacitor 44. A junction transistor 46 is normally biased off by a resistor 47 so that resistor 48, connected between a voltage source of +V volts and the collector of field-effect transistor 42, provides voltage through a charging resistor 49 to the capacitor 44. An input resistor 51 is connected between the base of the transistor 46 and a start signal input terminal 52. The resistor 49 is selected to be considerably larger than the resistor 48. Therefore, the charging and discharging time constant of the capacitor 44 is essentially the product of the resistance 49 and the capacitor 44. The value of the resistor 41 is chosen so that with the terminal 52 at +V for a long period of time compared to the time constant of the resistor 49 and the capacitor 44 the voltage across the capacitor 44 is zero, and the resultant signal at terminal 43 will very nearly equal the signal at terminal 39. Similarly, with ground on terminal 52 for a similar period of time, the voltage across capacitor 44 is +V, and the signal at the terminal 43 is at least 40 db down from the signal at terminal 39.

Referring again to FIG. 1, terminal 43 of the voltage controlled attenuator 24 and center tap 16 of delay line 12 are connected to a pair of input terminals 53 and 54 of a summing amplifier 56, which provides at output terminal 57 a signal proportional to the sum of signals applied to its input terminals 53 and 54.

Presently a ground signal appears on terminal 52 of the voltage controlled attenuator 24 so that output terminal 43 provides a signal equal to the sum of signals applied to terminals 22 and 23 and control input terminals 36$a$ and 36$b$ of voltage controlled multipliers 19$a$ and 19$b$ are preset. However, the signals appearing at the output terminals 21$a$ and 21$b$ are still unpredictable multiples of signals applied to input terminals 18$a$ and 18$b$. A digital data signal coded so that a signal above a predetermined level is considered a "1" and a signal below the predetermined level is considered a "0," is applied, by means not shown, to the input terminal 14 of the delay line 12. The received digital data signal has been distorted by transmission through a real transmission medium, not shown, and includes noise components so that the output of a binary slicer to which the received signal may be applied will contain approximately one error in fifty symbol bits. The signal has been passed through an AGC device not shown.

Time delayed replicas of the received digital data signal appear at the center tap 16 and the output 17 of the delay line 12. The received digital signal and the delayed replica appearing at the output 17 of the delay line 12 are multiplied in the voltage controlled multipliers 19$a$ and 19$b$ respectively by arbitrary multiples as determined by the transfer characteristics of the field-effect transistors herein. The resulting product signals are added in the voltage controlled attenuator 24 to provide a sum which is added to the delayed replica signal appearing at the center tap 16 to provide an equalized signal at the output terminal 57 of the summing amplifier 56. As is common practice a clock 58 synchronized with the received digital data signal periodically enables a sampling gate 59 to provide time samples of the equalized signal. The time samples of the equalized signal are sliced in a binary slicer 61, which may be a Schmitt trigger, to provide an equalized digital output signal which is a digitalization or normalization of the equalized signal having an amplitude equl to the data signal level nearest to the amplitude of the time samples of the equalized signal.

It should be clear that if the binary slicer 61 would provide an equalizer output signal containing one error in fifty bits with the receiver digital data signal applied thereto, then with arbitrary correction signals added to the received digital data signal, there is a strong likelihood that an even greater error rate would occur. Therefore, it is necessary initially to reduce the correction signals added to the received digital data signal as close to zero as possible until it is determined what correction signals would reduce the error rate in the equalized output signal below the error rate that would occur when the received digital data signal is applied to the binary slicer 61. Accordingly, a start signal generator 62 is provided which normally maintains the control input 52 of the voltage control attenuator 24 at ground potential thereby greatly reducing the signal appearing at terminal 43. The signal appearing at terminal 57 therefore is dependent solely upon the signal appearing at center tap 16 of the delay line 12 which is a time delayed replica of the received data signal. The start signal generator 62 responsive to the presence of a signal at the input 14 of delay line 12 brings the voltage at the control input 52 of the voltage control attenuator 24 to +V when a signal appears at input 14. This in turn turns on transistor 46, in FIG. 4, so that capacitor 44 is discharged through resistor 49, thereby decreasing the attenuation factor of the voltage controlled attenuator from its initial value to a steady state value. The rate of decrease is determined experimentally to allow the fastest possible equalization to occur. Start signal generator 62 may include a circuit sensitive to the frequencies contained in the received digital data signal for producing a ground level signal indicative of the absence of a digital data signal and a +V level signal indicative of the presence of a digital data signal.

Referring again to FIG. 1, the sample of the equalized signal appearing at the output terminal of the sampling gate 59 is subtracted from the equalized output signal appearing at the output terminal of binary slicer 61 in subtractor 63 to provide a difference signal which is delayed by a fixed delay element 64 by a time interval equal to a multiple of the pulse repetition interval of the digital data signal. The equalized output signal is temporarily stored in three-stage shift register 66 which is advanced one each pulse repetition interval by clock 58.

As explained in detail in the aforementioned copending patent application of R. W. Lucky, Ser. No. 460,794, the information stored in each stage of shift register 66 is sequentially multiplied by the delayed signal from the fixed delay element 64 in a pair of multipliers 67$a$ and 67$b$ to isolate the contribution to the intersymbol interference from each of the digital bits preceding and succeeding the bit present at the center tap 16 of the delay line 12. Since the information stored in the stages of the shift register 66 consists only of "1's" and "0's," multipliers 67$a$ and 67$b$ can be merely digital exclusive-OR circuits. The product signal from multipliers 67$a$ and 67$b$ are time averaged in low pass filters 68$a$ and 68$b$. A pair of slicers 69$a$ and 69$b$ are periodically enabled by counter 71 driven by the clock 58 to sample or slice the averaged error signals to determine the sign thereof. Slicers 69$a$ and 69$b$ are similar to binary slicer 61 except that a pulsed output is provided by slicers 69$a$ and 69$b$ while a D.C. level output is provided by binary slicer 61. The output pulses from slicers 69$a$ and 69$b$ modify the voltage appearing at control inputs 36$a$ and 36$b$ of the voltage control multipliers 19$a$ and 19$b$ in a direction to cause the intersymbol interference to be reduced. The experimental setting of the time constant of the start signal generator 62 is such that the attenuation factor of voltage controlled attenuator 24 providing a signal on terminal 39 is now decreased. Therefore, the signal now appearing on terminal 57 is the sum of the signal appearing on center tap 16 of delay line 12 and the signal appearing on output terminal 43 of voltage controlled attenuator 24. The individual error components in this signal are isolated as described above and voltage controlled multipliers 19$a$ and 19$b$ are again adjusted to minimize the error. By this time the attenuation factor of the signal voltage controlled attenuator 24 is again decreased. This adjustment sequence continuously repeats until the gain of voltage controlled attenuator 24 reaches steady state and the received digital data signal is optimally equalized. After voltage controlled attenuator 24 has reached a steady state condition, the system 10 operates to correct for dynamic changes in system 10 and in the transmission medium not shown.

Figure 2:
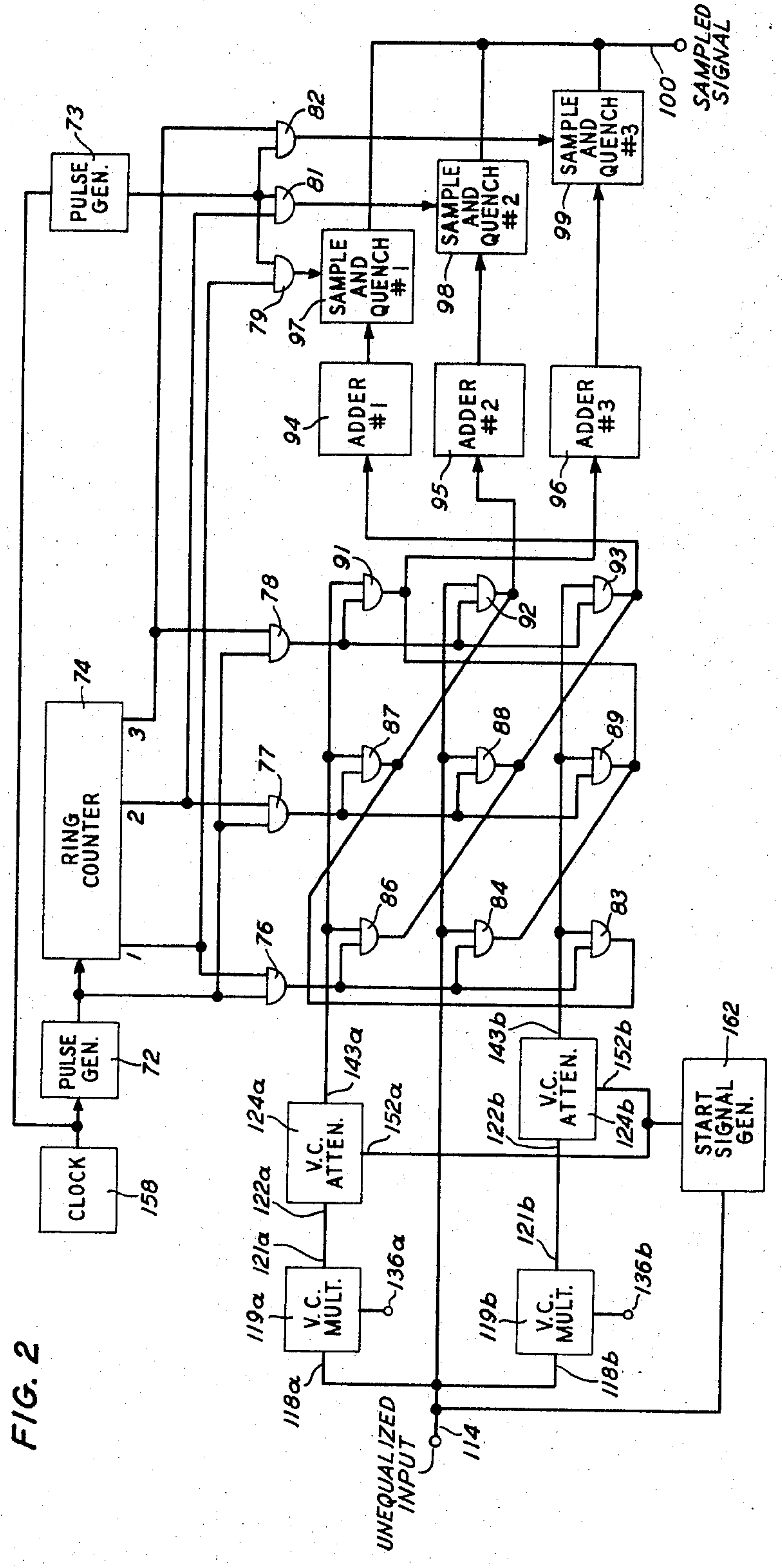
FIG. 2 depicts in block diagram form a digitalized transversal filter constructed according to the principles of this invention.

Referring now to FIG. 2, there is shown in block diagram form a digitalized transversal filter equalizer of the kind described in the aforementioned copending patent application of F. K. Becker, Ser. No. 333,030, modified in accordance with the principles of the present invention.

Blocks appearing in FIG. 2 which are similar to blocks already described in conjunction with FIG. 1 are given the same numbers as the corresponding blocks in FIG. 1 preceded by a "1"; for example, clock 158 in FIG. 2 is similar to the clock 58 shown and described in conjunction with FIG. 1.

Referring still to FIG. 2, clock 158 drives two pulse generators 72 and 73. Pulse generator 72 provides a narrow pulse for each cycle of clock 158. Pulse generator 73 generates a narrow pulse intermediate each pair of pulses from pulse generator 72.

Pulse generator 72 drives a three-stage ring counter 74 having first, second and third output terminals connected to gates 76, 77, and 78 for sequentially producing pulse output signals having one-third the repetition rate of clock 158. The interval between pulses at successive output terminals is, of course, at the clock interval. The output from pulse generator 72 is also applied directly to gates 76, 77, and 78 to provide timing pulses synchronized by ring counter 74, each timing pulses having a width determined by pulse generator 72.

The output signals from counter 74 are also fed to another trio of coincidence gates 79, 81, and 82. The output of pulse generator 73 is applied in such a manner that these gates produce sequential outputs at an overall frequency one-third that of the clock 158.

A received digital data signal applied to an input terminal 114 is simultaneously multiplied by a pair of voltage controlled multipliers **119*a* and 119*b* to provide a pair of product signals each of which is attenuated by a pair of voltage controlled attenuators 124*a* and 124*b*. By means of coincident or AND gates 83, 84, 86, 87, 88, 89, 91, 92, and 93 the attenuated product signal appearing at the output 143*a* of the voltage controlled attenuator 124*a*, the received digital data signal appearing on the terminal 114 and the attenuated product signal appearing at the output 143*b* of the voltage controlled attenuator 124*b* are directed sequentially under the control of timing gates 76, 77, and 78 to adders or accumulators 94, 95, and 96. The accumulated totals in adders 94, 95, and 96 are sampled sequentially one each clock interval by sample and quench circuits 97, 98, and 99. These circuits are enabled by the outputs of timing gates 79, 81, and 82**. The outputs of the sample and quench circuits are delivered to a common output terminal.

In operation the gates 83, 84, 86, 87, 88, 89, 91, 92, and 93 are enabled under the control of timing gates 76, 77, and 78 in sequence and in groups of three. An enabled gate of each group of three is connected to a different adder. Thus, gates 86, 84, and 83 are enabled simultaneously by timing gate 76 at one sampling instant to store in adders 94, 95, and 96 the signals on the terminals **143*a*, 114 and 143*b*, respectively. In the next sampling instant gates 87, 88, and 89 are enabled simultaneously to store in adders 94, 95, and 96 the signals on the terminals 143*a* 114, and 143*b*, respectively. In the third sampling instant gates 91, 92, and 93 are simultaneously enabled to store in adders 94, 95, and 96 the signals on the terminals 143*a*, 114, and 143*b***, respectively.

Gates 83, 84, 86, 87, 88, 89, 91, 92, and 93 may be thought of as forming a three-by-three matrix. They feed into adders 94, 95, and 96 in sequence successive samples of the signals on the terminals **143*a* 114, and 143*b* so that at the end of three sampling intervals adder 94 contains information indicating the equalized amplitude of one bit in the digital data signal. For this purpose, a diagonal lead connects the outputs of gates 86, 88, and 93 to the adder 94. Gates 84, 89, and 91 are enabled at successive sampling instants. At the end of the fourth sampling interval adder 95 contains information indicating the equalized amplitude of a second pulse in the digital data signal. At the end of a fifth sampling interval adder 96 contains information indicating the equalizer amplitude of a third bit in the digital data signal. Sample and quench circuits 97 through 99 feed the contents of adders 94 through 96, in sequence, to common terminal 100**. At this time the respective adders are quenched.

The digitalized transveral filter can be adaptively adjusted by substituting the digitalized transversal filter shown in FIG. 2 for the delay line 12, the voltage control multipliers **19*a* and 19*b*, the start signal generator 62, the voltage controlled attenuator 24, the summing amplifier 56 and the sampling gate 59 in the system of FIG. 1. The outputs of slicers 69*a* and 69*b* in FIG. 1 are connected to controlled inputs 136*a* and 136*b* of voltage control amplifiers 119*a* and 119*b* in FIG. 2, respectively. Common output 100 of the three sample and quench circuits 97, 98, and 99 of FIG. 2 are fed as an input to binary slicer 61 and the subtractor 63 of FIG. 1. The clocks 158 and 58 may be synchronized or only one clock employed. As with the system shown in FIG. 1 the start signal generator 162 of FIG. 2 is provided which normally maintains the control inputs 152*a* and 152*b* of voltage controlled attenuators 124*a* and 124*b*, at ground potential thereby greatly reducing the signals appearing at the terminals 143*a* and 143*b*. The signal passed on to the sample and quench circuits 97, 98, and 99 therefore is solely dependent upon the signal at the terminal 114. Start signal generator 162 responsive to the presence of a signal at terminal 114 brings the voltage at control inputs 152*a* and 152*b* of voltage controlled attenuators 124*a* and 124*b* to +V to decrease the attenuation factor of voltage controlled attenuators 124*a* and 124*b***. The rate of decrease is determined experimentally.

It is to be understood that the above-described arrangements are simply illustrative of the application of the principles of this invention. Numerous other arrangements embodying the principles of the invention will be readily apparent to those skilled in the art.

What is claimed is:

1. A system for equalizing an information signal distorted by transmission through a signal distorting transmission medium comprising:
- means for multiplying said information signal by a first value to provide an equalization signal;
- means for initially attenuating said equalization signal by a time variable value to provide an attenuated equalization signal; and
- means for algebraically combining said attenuated equalization signal and said information signal to provide an equalized output signal.

2. A system as defined in claim 1 wherein said attenuating means comprises:
- means for generating a control signal which increases from a zero reference value to a steady state value, and
- means responsive to said control signal for attenuating said equalization signal to provide an attenuated equalization signal proportional to the product of said equalization signal and said control signal.

3. A system as defined in claim 2 also including means responsive to said information signal for initiating generation of said control signal.

4. A system for equalizing an information signal transmitted through a signal distorting transmission medium comprising:
- a delay line for delaying said information signal to provide a delayed signal;
- first means for multiplying said delayed signal by a first value to provide an equalization signal;
- means for attenuating said equalization signal by a time variable value to provide an attenuated equalization signal; and
- means for algebraically combining said attenuated equalization signal and said information signal to provide an equalized output signal.

5. A system as defined in claim 4 for equalizing a discrete level coded information signal including:
- means for providing a normalized signal having an amplitude equal to the discrete level nearest the amplitude of said equalized output signal;
- means for providing an error signal equal in amplitude to the difference between said normalized sigknal and said equalized output signal;
- means for delaying said error signal;
- second means for multiplying said delayed error signal by the sign of said normalized signal to provide a product signal;
- means for time averaging said product signal to provide an averaged product signal; and
- a binary slicer for providing a control signal in accordance with the sign of said averaged product signal;
- said first multiplying means periodically responding to said control signal by incrementally varying said first value in accordance therewith.

6. A system for equalizing an information signal transmitted through a signal distorting transmission medium comprising:
- means for multiplying said information signal by a first value to provide an equalization signal;
- means for attenuating said equalization signal by a time variable value to provide an attenuated equalization signal;

an accumulator for totalling signals applied thereto to provide an equalized output signal; and means for sequentially applying said attenuated equalization signal and said information signal to said accumulator.

7. A system for equalizing an information signal transmitted through a signal distorting transmission medium comprising:

a tapped delay line for delaying said information signal having first and second terminals to provide first and second delayed signals;

means for multiplying said first delayed signal by a first value to provide a first equalization signal;

means for multiplying said information signal by a second value to provide a second equalization signal;

variable gain means for algebraically combining said first and second equalization signals to provide a composite equalization signal; and means for algebraically combining said composite equalization signal and said second delayed signal to provide an equalized output signal.

References Cited

UNITED STATES PATENTS 3,292,110 12/1966 Becker et al. ------ 333—70 XR

HERMAN KARL SAALBACH, *Primary Examiner.*

MARVIN NUSSBAUM, *Assistant Examiner.*

U.S. Cl. X.R.

307—229, 279, 264; 333—70